Sept. 10, 1940.  H. J. SEAMAN  2,214,702
SOIL TILLER
Filed Feb. 7, 1938   2 Sheets-Sheet 2
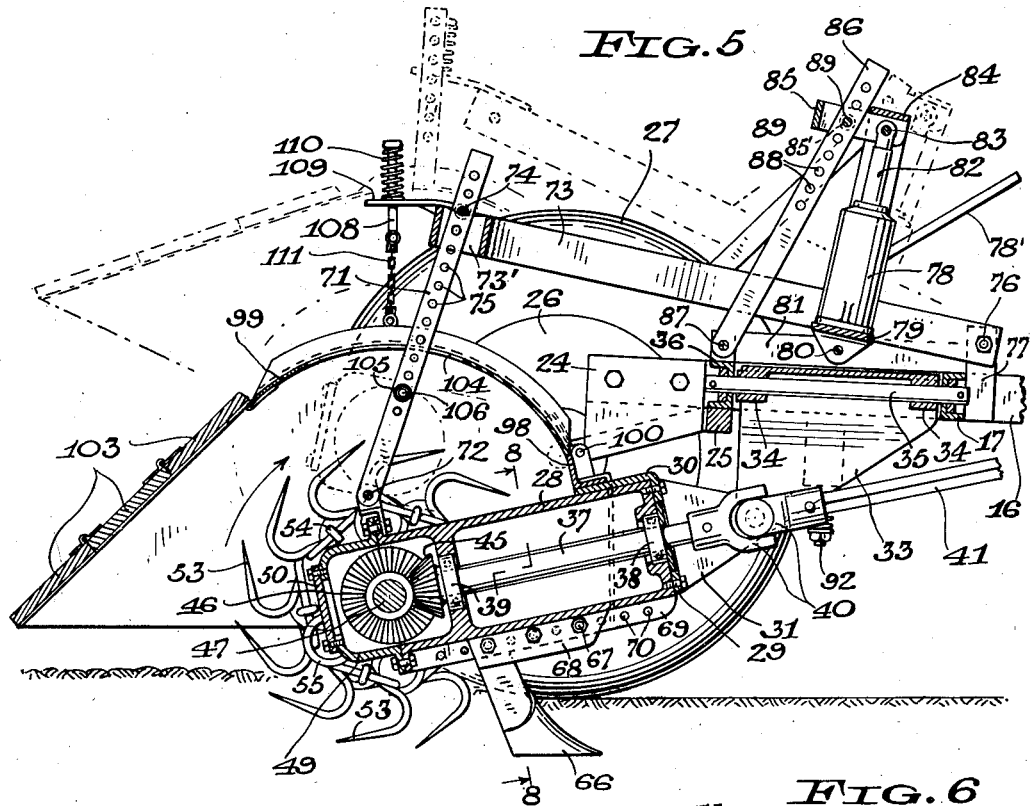
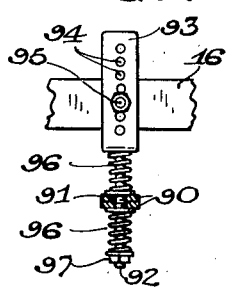
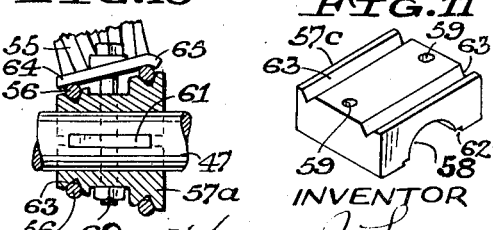
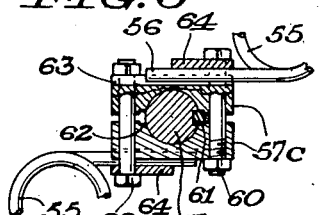
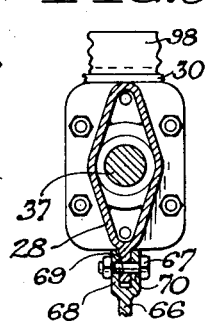
INVENTOR
Harry J. Seaman
By
ATTORNEY Patented Sept. 10, 1940

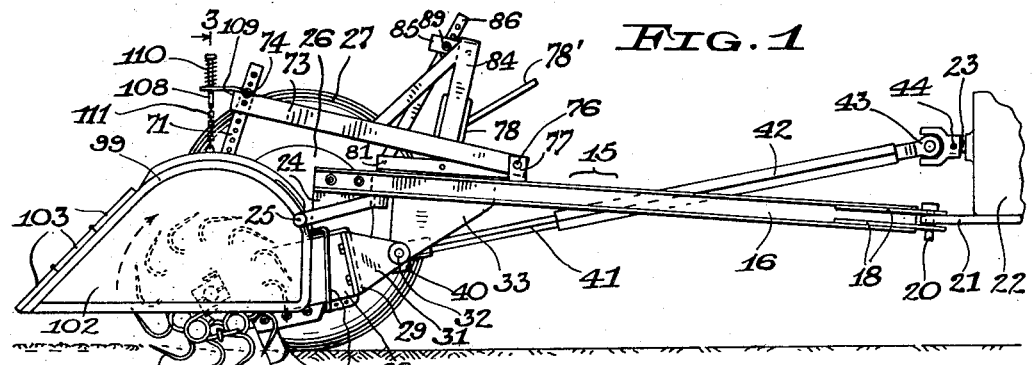

2,214,702

UNITED STATES PATENT OFFICE 2,214,702

SOIL TILLER

Harry J. Seaman, Milwaukee, Wis.

Application February 7, 1938, Serial No. 189,058

9 Claims. (Cl. 97—40)

The invention relates to agricultural machines, and more particularly to soil tillers.

Soil tillers of the rotary type as heretofore constructed have been open to various objections, such as liability to derangement or breakage of the mechanism by stones or other obstructions in the soil, difficulty of adjustment to meet different operating conditions, limited capacity, and relatively expensive construction.

It is an object of the present invention to provide an improved rotary soil tiller in which the rotor carrying the soil-working tools is yieldably mounted to avoid derangement by obstructions in the soil.

Another object of the invention is to provide a soil tiller in which the tool-carrying rotor is tiltably supported in such manner that the opposite ends of the rotor are free to yield individually under excessive pressures.

A further object is to provide a soil tiller in which the angle of the rotor axis with respect to the frame of the machine may readily be adjusted to meet different operating conditions.

Still further objects are, to provide a soil tiller which will operate efficiently and till a relatively wide swath; which is particularly adapted for tractor operation; which has simple but effective means for mounting the tilling tools; which is capable of ready adjustment to vary the tilling depth; which is of strong, durable and lightweight construction; which is capable of economical manufacture, and which is adaptable for high speed road transport.

The invention further consists in the several features hereinafter described and claimed.

In the accompanying drawings, illustrating one specific embodiment of the invention, Fig. 1 is a side elevation of a soil tiller constructed in accordance with the invention, the near wheel of the tiller being removed;

Fig. 2 is a top view of the machine, parts being broken away;

Fig. 3 is a sectional elevation taken generally along the line 3—3 of Fig. 1;

Fig. 4 is a sectional elevation of the tool-carrying tiller shaft, taken along the line 4—4 of Fig. 3;

Fig. 5 is a sectional elevation taken generally along the line 5—5 of Fig. 2;

Fig. 6 is a sectional view taken generally along the line 6—6 of Fig. 2, and showing a resiliently mounted torque arm of the machine;

Fig. 7 is a detail sectional view taken along the line 7—7 of Fig. 6;

Fig. 8 is a detail sectional view taken generally along the line 8—8 of Fig. 5;

Fig. 9 is a detail sectional view of one of the tiller shaft tool mountings, taken transversely of the tiller shaft;

Fig. 10 is a detail sectional view of another of the tiller shaft tool mountings, taken longitudinally of the tiller shaft, and Fig. 11 is a perspective view of a holder or carrier for one of the tool mountings.

In the drawings, the invention is shown to be embodied in a soil tiller in the nature of a trailer for operation by a tractor, but, as will hereinafter appear, certain features of the invention are also applicable to a self-propelled machine.

The frame 15 of the soil tiller is of generally triangular shape and comprises forwardly converging side bars 16 which are welded or otherwise secured to a cross bar 17, the several bars being of channel cross-section. At their front ends the side bars 16 are welded or otherwise secured to spaced upper and lower V-shaped coupling plates 18 having aligned openings 19 to receive a coupling pin 20 by which the frame is detachably secured to the draw-bar 21 of a tractor 22. The tractor is provided with the usual rearwardly projecting power take-off shaft 23 above the draw-bar.

The rear ends of the side bars 16 are bolted or otherwise secured to vertical plates 24 to the lower portions of which an axle 25 is welded or otherwise secured. The axle, which forms part of the frame, extends parallel to the cross bar 17, and the aligned axle ends are offset rearwardly and have wheels 26 rotatably mounted thereon, here shown to carrry pneumatic tires 27.

A housing 28 at the rear of the machine extends longitudinally of the machine in the vertical median plane of the frame 15, and has a flanged front end to which is bolted a bracket 29. The bracket has a rearwardly projecting top flange 30 above the gear housing, and a pair of laterally spaced, forwardly projecting flanges or arms 31 which are at opposite sides of the vertical median plane of the frame and housing. The spaced front ends of the arms 31 are pivotally secured by aligned horizontal bolts 32 to the laterally spaced parallel lower ends of a hanger or yoke 33 of inverted U-shape. The hanger has aligned front and rear bushings 34 welded or otherwise secured at its upper portion to receive an approximately horizontal shaft 35 which is journalled at its front end in the cross bar 17 and at its rear end in a bearing bracket 36, Fig. 5, secured to the cross portion of the axle 25, the shaft lying in the vertical median plane of the frame and at right-angles to the axis of the horizontal pivot bolts 32.

A pinion shaft 37, Figs. 5 and 8, is journalled in the housing 28 on front and rear anti-friction bearings 38 and 39, respectively, and at its front end is secured to one element of a universal joint 40, the other element of which is secured to a drive shaft 41, preferably of square cross-section. The universal joint is located between, and substantially at the axis of, the spaced pivot bolts 32. A hollow shaft 42 of square cross-section telescopically fits on the driven shaft 41 and at its front end is secured to one element of a universal joint 43, Fig. 1, the other element of which is detachably secured to the power take-off shaft 23 of the tractor by a screw 44. Preferably, several selectively usable hollow shafts 42 with universal joints of different sizes are provided.

At its rear end the pinion shaft 37 is provided with a bevel pinion 45 which meshes with a bevel gear 46 on the medial portion of a transversely extending tiller shaft 47 rotatably mounted in the gear housing by anti-friction bearings 48. Preferably, the rear end of the gear housing is formed by a flanged cover 49 bolted in place and having a detachable closure plate 50. The bearings 48 are preferably carried in cupped casing members 51 bolted to opposite sides of the housing. The casing members 51 also carry grease retainers at the outer sides of the bearings. The axis of the tiller shaft is parallel to the axis of the pivot bolts 32 and is preferably spaced a short distance rearwardly from the vertical plane of the wheel axis.

The tiller shaft 47 projects from opposite sides of the gear housing 28 and carries thereon a plurality of axially spaced tilling or soil-working devices. By way of example, six tilling devices are carried on each projecting end of the shaft. Each tilling device comprises a pair of tools here shown in the form of diametrically opposite hooked tines 53 which have looped ends 54 firmly but detachably mounted in a well known manner on the looped intermediate portions of coiled springs 55. Each spring 55 has spaced parallel inner ends 56 secured to a mounting member carried on the shaft. In the present instance, the mounting members are of three types, designated 57a, 57b, and 57c, and are arranged in diametrically opposite pairs. Each mounting member has a semi-cylindrical opening or channel 58, Fig. 11, to fit on the shaft, and has a pair of parallel bores 59 at opposite sides of the channel 58 to receive clamping bolts 60 by which a pair of opposed mounting members are clamped on the shaft, the bores 59 extending at right angles to the channel. Each pair of mounting members are held against relative rotation on the shaft by a key 61 which is seated in the shaft and which fits in grooves 62 formed in the mounting members along the edges of the semi-cylindrical openings 58. The outer face of each mounting member is provided with transversely extending parallel V-grooves 63 to receive the spring ends 56 which are held therein by a clamping plate 64 secured in place by one of the bolts 60. If desired, a side edge of the plate 64 may be hooked as indicated at 65 in Fig. 10. The mounting members 57a, which are nearest to the gear housing 28, have their grooves 63 at different distances from the axis of the shaft, the groove farther from the housing being farther from this axis, as indicated in Figs. 3 and 10, to cause the cutting ends of the tines 53 to project toward and overhang the gear housing and thereby till the soil under the housing. To further improve the tilling, a subsoiler and spreader 66, arranged centrally under the gear housing, is adjustably secured to the housing by bolts 67 which pass through spaced cheeks 68 of the subsoiler and through an intervening vertical bottom flange 69 on the housing, the flanges being provided with a plurality of openings 70 to selectively receive the bolts. The pairs of mounting members 57b, which are next to the members 57a, are similar thereto, but place the tines at a smaller angle to a normal to the shaft, as indicated by dotted lines in Fig. 3, the path of the outer ends of these tines being about midway between the paths of the laterally adjacent tines. The mounting members 57c form the other four pairs of mounting members on each projecting portion of the shaft, the tines mounted thereon being at right-angles to the shaft. The six tilling units at each side of the gear housing are angularly spaced and distributed on the tiller shaft, any two adjacent units preferably having a wide angular spacing. The tilling units are positioned by the keys 61 which are angularly spaced on the shaft.

The gear housing 28, carrying the tiller shaft 47, is pivotally supported at its front end on the pivot bolts 32 to swing or tilt in an up and down direction, and is adjustably suspended at its rear portion by a bar 71. The bar is pivotally secured at its lower end to the rear portion of the housing by a pin 72, and is adjustably pivoted at its upper portion on the rear end of a forwardly diverging V-shaped suspension frame 73 by a pin 74, the bar passing through a slot 73' in the frame 73, and the pin 74 passing through any one of a series of openings 75 formed in the bar and resting on the upper edge of the frame 73. The spaced front ends of the suspension frame are pivotally secured by aligned horizontal bolts 76 to brackets 77 rigidly secured to the main frame cross bar 17. The suspension frame 73 is adjustably elevated by a hydraulic jack 78 having an operating handle 78'. The jack is carried on a base 79 pivotally secured by aligned horizontal bolts 80 to spaced parallel angle bars 81 rigidly connecting the frame cross bar 17 and bracket 36. The upper end of the jack plunger 82 is pivotally secured by a bolt 83 to a braced arch bar 84 rigidly secured to, and projecting upwardly from, the suspension frame 73. The arch bar at its upper end carries a rearwardly projecting slotted arm 85 through which extends a supporting bar 86. The lower end of the bar 86 is pivotally secured by a pin 87 to the bracket 36, and the bar is provided with a series of selectively usable openings 88 to receive a detachable bolt or pin 89 by which the bar adjustably supports the suspension frame 73, the bolt either engaging the lower edge of the slotted arm 85 or passing through aligned opening 85' in the arm, as desired, the latter relation being shown. The supporting bar 86 insures proper positioning of the suspension frame irrespective of possible leakage in the hydraulic jack.

The gear housing 28 is resiliently restrained against rotation about its longitudinal axis by a transversely extending torque arm 90 welded or otherwise secured to the pivoted hanger or yoke 33. The torque arm has a slot 91 at its outer end receiving therethrough a screw-threaded stem 92 projecting downwardly from an attached bar 93, the bar having a series of openings 94 to selectively receive a clamping bolt 95 by which the bar is adjustably secured to a side bar 16 of the machine frame. Coiled springs 96 are mounted on the stem above and below the torque arm and are placed under compression by a nut 97 on the lower end of the stem.

The rearwardly projecting flange 30 of the bracket 29 at the front of the gear housing has secured thereto, as by welding, an angle bar 98 which extends transversely of the machine. A hood 99 extends over the tool-carrying tiller shaft and between the wheels 26 and has its front portion hinged at 100 to the angle bar 98, the hood having a curved reinforced top wall 101 and vertical side walls 102 adjacent the opposite ends of the tiller shaft. The hinge axis of the hood is substantially parallel to the axis of the pivot bolts 32 for the housing 28. The sloping rear portion of the top wall is formed by a plurality of hingedly connected boards or panels 103 which may be rolled forwardly and upwardly for access to the mechanism, and which will yield to pass stones or other obstructions. The bottom edges of the hood normally extend a short distance above the ground. The top wall of the hood has a slot 104 to pass the suspension bar 71, and the hood is liftable by this bar by means of rollers 105 adjustably secured to the bar by a bolt 106 passing through one of the openings 75 in the bar, the rollers being on opposite sides of the bar and engageable with the bottom face of the top wall of the hood. A pair of downwardly projecting aprons 107 are secured to the angle bar 90 at opposite sides of the gear housing to form front continuations of the hood.

A resiliently mounted hook bolt 108 is slidably mounted in a rearwardly projecting arm 109 on the suspension frame 73, the upper portion of the hook bolt passing through a coiled spring 110. The resiliently mounted hook bolt supports the hood 99 by means of a suspension chain 111. Adjustment of the suspension bar 71 serves to vary the relative elevation of the hood with respect to the tilling shaft. The rollers 105 on the suspension bar are spaced below the top wall of the hood, but if the rotor rises sufficiently during tilling the rollers will lift the hood so as to maintain clearance between the hood and the rotor tools. For road transport of the machine, the suspension bar 71 is transferred to the resiliently mounted hook bolt 108, and, if desired, the hook bolt may also be used in this manner during tilling operations.

In setting up the machine for use, tines 53 of a suitable type are mounted on their supporting springs 55, and the cutting depth is adjusted by operating the hydraulic jack 78, the adjustment being retained by the supporting bar 86 and pin 89. The wheeled frame 15 is coupled to the tractor 22 and the universal 43 is secured to the power take-off shaft of the tractor.

In operation, the tiller shaft is driven at a suitable speed in the direction indicated by arrows, causing the hooked, self-sharpening, pick-forming tines 53 to enter, break up and pulverize the soil, the subsoiler 66 loosening and spreading the soil below the gear housing. Simultaneously, the machine moves forward at a low rate of speed. The operation of the tiller shaft imposes a forward thrust on the coupling 20, which thrust is somewhat counteracted by the subsoiler 66. The gear housing is resiliently restrained against rotation by the spring-mounted torque arm 90. If the tool-carrying tiller shaft should strike stones or other obstructions in the soil, the pivoted gear housing is free to rise and thereby relieve the spring-mounted tines and shaft of excessive pressure, and if a tine at either side of the gear housing should strike an obstruction the tiller shaft will tilt under the restraint of the spring-mounted arm 90 and relieve the pressure. The hood 99 confines the milled or pulverised soil from flying about, and the impact of soil masses against the hood contributes to the pulverizing action. When the tiller shaft rises upon encountering a soil obstruction, the hood rises only slightly, thus reducing inertia effects and avoiding excessive lifting of the hood above the ground. The tiller shaft can be tilted to various angles with respect to the machine frame by shifting the bar 93 up or down. This is useful in cases where one wheel of the machine rides in a ditch or furrow. When coarser soil-working is desired, the machine is drawn at a higher speed, or one tool is removed from each of the several tilling devices. For some types of operations, such as quack grass eradication, the subsoiler 66 may be removed, the tines nearest the gear housing being sufficiently close to the central vertical plane of the machine to break up the soil under the housing.

The yielding mounting of the tool-carrying tiller shaft, and particularly the tiltable mounting thereof, permits the shaft to be made relatively long without being excessively heavy and without danger of derangement or breakage, thereby enabling the machine to till a wide swath. The compression of the tilt-restraining springs 96 may readily be adjusted by the nut 27, so as to obtain the desired resistance.

The machine can be used for various purposes, such as preparing seed beds, mixing fertilizer with the soil, eradicating weeds and insect pests, and cutting paths and fire lines.

For road transport of the machine, the suspension bar 71 is transferred to the spring-mounted hook bolt 108, and the suspension frame 73 is elevated by the hydraulic jack 78 (the pin 89 being removed during lifting) to place the parts in the dotted line position shown in Fig. 5, the tilling tools and hood being well spaced above the ground. In the lifting operation, the gear housing 28 swings upwardly on the pivot bolts 32. The drive shafts 41, 42, may be suitably lashed to the machine frame. The machine may be towed at a good rate of speed by a truck, tractor or other vehicle, the resilient mounting of the tiller rotor and hood reducing the unsprung weight.

While the invention is here shown to be embodied in a trailer-type machine, it will be obvious that many features of the invention are also applicable to self-propelled machines.

What I claim as new and desire to secure by Letters Patent is:

1. In an agricultural machine, the combination of a soil-working rotor having opposite free ends, means for driving said rotor, means for shiftably supporting said rotor to permit both upward translation and transverse tilting of said rotor for yielding to soil obstructions, resilient means for resisting said transverse tilting in both upward and downward directions, and means for adjusting the force exerted by said resilient means.

2. In an agricultural machine, the combination of a frame, a soil-working rotor shiftably carried by said frame to yield to soil obstructions, means for driving said rotor, and a hood for said rotor relatively yieldable with respect to the rotor axis.

3. In an agricultural machine, the combination of a frame adapted to travel over soil to be worked, a support pivotally mounted on said frame to rock about an approximately horizontal axis extending approximately in the direction of travel of said frame, resilient means resisting angular movement of said support about said axis, a housing pivotally mounted on said support to swing up and down about an approximately horizontal transverse axis, a soil-working rotor carried by said housing at a distance from said transverse pivotal axis, said transverse pivotal axis and rotor axis being substantially parallel, and means for driving said rotor.

4. In an agricultural machine, the combination of a frame adapted to travel over soil to be worked, a soil-working rotor shiftably carried by said frame and having its axis extending transversely of the direction of frame travel, said rotor having free ends, means for driving said rotor, and means including a pivotally mounted torque arm for adjusting the angle of the rotor axis with respect to said frame.

5. In an agricultural machine, the combination of a soil-working rotor, means for yieldably supporting said rotor, a hood over said rotor, and means for resiliently supporting said hood.

6. In an agricultural machine, the combination of a soil-working rotor, means for tiltably mounting said rotor to yield to soil obstructions, and resilient means for restraining the tilting of said rotor in both up and down directions and including a pair of oppositely acting coiled springs.

7. In an agricultural machine, the combination of a frame, a transverse soil-working rotor shiftably carried by said frame, said rotor being tiltable in its axial plane to yield to soil obstructions, means for driving said rotor, and resilient means shiftably carried by said frame for adjusting the angle of the rotor axis with respect to said frame and for resisting the tilting of said rotor in both upward and downward directions.

8. In an agricultural machine, the combination of a frame, a soil-working rotor shiftably carried by said frame and tiltable transversely for yielding to soil obstructions, a stem carried by said frame, and means for yieldingly restraining tilting of said rotor in both upward and downward directions comprising a torque arm and compressed coiled springs acting thereon in opposite directions and mounted on said stem.

9. In an agricultural machine, the combination of a frame, a transverse soil-working rotor shiftably carried by said frame to yield to soil obstructions, and a hood for said rotor relatively yieldable with respect to the rotor axis and having a pivotal mounting at a point forward of the vertical plane of the rotor axis.

HARRY J. SEAMAN.